United States Patent [19]
Lessner et al.

[11] Patent Number: 6,056,899
[45] Date of Patent: May 2, 2000

[54] PREPARATION OF CONDUCTIVE POLYMERS FROM STABILIZED PRECURSOR SOLUTIONS

[75] Inventors: Philip M. Lessner, Simpsonville; Tsung-Yuan Su, Greer; Randolph S. Hahn, Greenville; Veeriya Rajasekaran, Greenville, all of S.C.

[73] Assignee: Kemet Electronics Corporation, Greenville, S.C.

[21] Appl. No.: 09/321,740

[22] Filed: May 28, 1999

Related U.S. Application Data

[62] Division of application No. 09/148,484, Sep. 4, 1998.
[51] Int. Cl.$^7$ .......................................................... H01B 1/06
[52] U.S. Cl. .................... 252/518.1; 252/500; 252/519.2; 252/182.11
[58] Field of Search .................................. 252/518.1, 510, 252/511, 519.2, 513, 821.11, 500; 524/81

[56] References Cited

U.S. PATENT DOCUMENTS

| | | |
|---|---|---|
| 4,697,001 | 9/1987 | Walker et al. . |
| 4,910,645 | 3/1990 | Jonas et al. . |
| 5,205,965 | 4/1993 | Uetani et al. . |
| 5,227,092 | 7/1993 | Han . |
| 5,278,213 | 1/1994 | Han et al. . |
| 5,378,402 | 1/1995 | Cross et al. . |
| 5,514,771 | 5/1996 | Nakama et al. . |
| 5,728,321 | 3/1998 | Abe et al. . |

*Primary Examiner*—Yogendra Gupta
*Assistant Examiner*—Derrick G. Hamlin
*Attorney, Agent, or Firm*—Banner & Witcoff, Ltd.

[57] ABSTRACT

Conductive polymers are prepared from a stabilized solution containing a monomer, an Fe(III) oxidizing agent, and a mixed solvent. The solvents are selected to stabilize the Fe(III) oxidizing agent and monomer in solution while allowing highly conducting polymers to be produced upon evaporating the lower-boiling solvent. The higher-boiling solvent does not appreciably complex with Fe(III), while the lower-boiling solvent forms a weak complex with Fe(III). The mixed-solvent system of the present invention may be used for preparing a conductive polymer counter electrode in a solid tantalum capacitor by polymerizing the monomer inside a porous tantalum pellet.

9 Claims, No Drawings

PREPARATION OF CONDUCTIVE POLYMERS FROM STABILIZED PRECURSOR SOLUTIONS

This application is a divisional of Ser. No. 09/148,484, filed Sep. 4, 1998.

FIELD OF THE INVENTION

The present invention relates to stabilized solutions useful for the synthesis of conductive polymers. Conductive polymers can be chemically synthesized from a monomer, an oxidizing agent, and a dopant. Normally such solutions have a very limited useful life because the monomer reacts with the oxidizing agent in the solution. The solutions may be used for the production of conductive polymer cathodes for solid tantalum capacitors.

BACKGROUND OF THE INVENTION

A solid state electrolytic capacitor is made from a porous pellet of sintered tantalum powder, a dielectric tantalum oxide layer formed on the surface of the sintered tantalum powder, a solid-state conductor impregnated into the volume of the pellet, and external connections such as silver paint, etc. The tantalum forms the positive electrode of the capacitor and the solid-state conductor forms the negative electrode (also called the cathode or counter-electrode).

Manganese dioxide has been employed as the solid-state conductor in tantalum capacitors for the last 50 years. To impregnate the pellet with manganese dioxide, it is dipped into a solution of manganese nitrate. The pellet is then heated in air or steam to temperatures in excess of 200° C. to pyrolyze the manganese nitrate to manganese dioxide. This process of dipping and pyrolysis is repeated several times to fill the pellet with manganese dioxide. By carefully choosing the sequence of concentrations of manganese nitrate and the pyrolysis conditions, a capacitor with a high capacitance recovery and a high volume fill of manganese dioxide can be produced.

A key property of manganese dioxide is its self-healing ability. At defective portions of the dielectric film, the manganese dioxide becomes non-conductive. This is due to the manganese dioxide transforming to a lower manganese oxide because of joule heating at the defect site. This mechanism allows capacitors with low leakage currents to be produced. It also allows small dielectric defects that occur during manufacture and use to be isolated. However, if the dielectric defect is too large, the dielectric can crack. Manganese dioxide is a powerful oxidizing agent. When it comes in direct contact with tantalum through a crack in the oxide, the capacitor can ignite, leading to destruction of the capacitor and possible destruction of other components in the circuit. It is desirable to replace the manganese dioxide with a solid-state conductor that is non-oxidizing, therefore eliminating tantalum ignition while maintaining the self-healing mechanism.

The use of tantalum capacitors in high frequency circuits has become more important. This has led to the need for tantalum capacitors having low equivalent series resistance (ESR). The best manganese dioxide has a resistivity of 0.5 to 10 ohm-cm. It is desirable to replace the manganese dioxide with a solid-state conductor that has a lower resistivity. However, many highly conductive metals and oxides do not have a self-healing ability and thus are not suitable for solid-state tantalum capacitors.

Conductive polymers such as polypyrroles, polyanilines, and polythiophenes have resistivities 10 to 100 times less than that of manganese dioxide. Since they are much less powerful oxidizing agents than manganese dioxide, these materials do not cause the capacitor to ignite upon failure. Polypyrrole was shown to have a self-healing mechanism (Harada, NEC Technical Journal, 1996).

Chemical oxidative polymerization is an effective way to impregnate conductive polymer into the pores of the tantalum pellet. In chemical oxidative polymerization, a monomer, oxidizing agent, and a dopant are reacted inside the porous pellet to form the conductive polymer. Monomers include pyrrole, aniline, thiophene, and various derivatives of these compounds. The oxidizing agent can be either an anion or a cation. Typical anion oxidizers are persulfate, chromate, and permanganate. Typical cations are Fe(III) and Ce(IV). The best dopants are anions of strong acids such as perchlorate, toluenesulfonate, dodecylbenzenesulfonate, etc. The reaction between monomer, oxidizing agent, and dopant can take place in a solvent such as water, an alcohol, a nitrile, or an ether.

Several methods have been used to get the monomer, oxidizing agent, and dopant into the porous pellet and carry out the conversion to conductive polymer. In one method, the pellet is first dipped in a solution of the oxidizing agent and dopant, dried, and then dipped in a solution of the monomer. After the reaction is carried out, the pellet is washed and then the process is repeated until the desired amount of polymer is deposited in the pellet. In this method, it is difficult to control the morphology of the final polymer. It is also difficult to control the exact reaction stoichiometry between the monomer and the oxidizing agent. Control of this stoichiometry is critical to achieve the highest conductivity polymer (Satoh et al., Synthetic Metals, 1994). Cross contamination of the dipping solutions is a problem. Since the pellet must be dipped twice for each polymerization, the number of process steps is greatly increased. The excess reactants and the reduced form of the oxidizing agent need to be washed out of the part. This adds even more process steps and complexity to the process.

In a related method, the sequence is reversed so that the pellet is dipped in the monomer solution first and the solvent is evaporated away. The pellet is then dipped in the oxidizing agent/dopant solution and the reaction is carried out. This method suffers from all the disadvantages of the previous method. In addition, some monomer may be lost in the solvent evaporation step.

In the preferred method, all components are mixed together and the pellet is dipped in the combined solution. This method reduces the number of dips and allows more precise control over the reaction stoichiometry. However, the monomer and oxidizing agent can react in the dipping bath, causing premature polymerization and loss of reactants, adding some cost and complexity to the process. This is especially a problem with pyrrole monomer and Fe(III) oxidizing agents. To partially overcome this, the dipping bath can be kept at cryogenic temperature (Nishiyama et al., U.S. Pat. No. 5,455,736). However, use of cryogenic temperatures adds considerable equipment and operational complexity to the process.

The pyrrole/Fe(III) can be replaced with a monomer/oxidizing agent combination that is less reactive. For example, 3,4 ethylenedioxythiophene and an Fe(III) salt of an organic acid may be dissolved in alcohol or acetone (Jonas et al., U.S. Pat. No. 4,910,645). With this combination, dilute solutions (less than 5% monomer) are stable near room temperature for several hours. The polymer (poly (3,4 ethylenedioxythiophene) or PEDT) can be formed by warming the solution. At concentrations greater than about 5% monomer, the components react quickly. Cooling the dipping solution can be used to retard the reaction. However, there is a lower limit to which the solution can be cooled because of limited solubility of the components at low temperatures. Addition of a nonvolatile organic base, such as imidazole, also inhibits the reaction (Mutsaers et al., EP 0615256 A2, 1994; de Leeuw et al., 1994). However, this leaves an organic residue in the pores of the tantalum capacitor that is difficult to wash out.

Because of the trend toward higher surface area (higher charge) tantalum powders, it is desirable to use more concentrated monomer/oxidizing agent/doping solutions to more effectively cover the internal surface area of the tantalum pellet in a reasonable number of dips. The instability of solutions of monomers/oxidizing agents/dopants at higher concentrations is an impediment to achieving that objective.

It is known in the art that the choice of solvent can greatly affect the reaction rate between the monomer and the oxidizing agent. For example, Myers (J. Electron. Mater., 1986) prepared polypyrrole from pyrrole and Fe(III) chloride in several different solvents. The preparation was done by mixing the components in solution and allowing the reaction to take place without evaporation of the solvent. The highest yields of polypyrrole were obtained in solvents which did not appreciably complex with Fe(III). Solvents which showed a strong exotherm on addition of Fe(III) gave very low yields.

More recently, Lebedev et al. (Chem. Mater., 1998) studied the reaction between an Ag(I) salt and neutral forms of polythiophene derivatives. The Ag(I) oxidizes the neutral polymer to an oxidized conducting form of the polymer. The counter ion of the salt becomes the polymer dopant. This reaction takes place quickly in solvents such as xylene, toluene, heptane, and chloroform. In order to stabilize such solutions, Lebedev et al. use a mixed solvent system of toluene, heptane and pyridine. The pyridine complexes with Ag(I) and prevents the reaction in solution. When the pyridine is allowed to evaporate from the mixed solvent system, the Ag(I) oxidizes the polymer to a conducting form. The system of Lebedev et al. is not suitable for use in preparation of capacitors for several reasons: the Ag(I) reactant is expensive, the Ag(0) reaction product would be difficult to remove, and the neutral polythiophenes are only soluble in low concentrations.

A mixed solvent system is also taught by Nakama (U.S. Pat. No. 5,514,771, 1996). Ion-doped poly(alkyl-substituted pyrrole) with a concentration of greater than 5% is prepared in an organic solvent and may be used as a solid electrolyte in a capacitor. Alkyl-substituted pyrrole is dissolved in a solvent comprising THF, aliphatic alcohols, or mixtures thereof. An oxidizing agent such as a ferric (III) salt polymerizes the alkyl-substituted pyrrole, and water is added to separate the product by filtration. The mixed solvent system dissolves the reactants and does not prohibit the polymerization reaction.

SUMMARY OF THE INVENTION

It is therefore an object of the present invention to stabilize mixed solutions of a monomer, an Fe(III) oxidizing agent, and dopant against polymerization by dissolving the monomer, Fe(III) oxidizing agent, and dopant in a mixture of two solvents where the higher-boiling solvent does not appreciably complex with Fe(III) and the lower-boiling solvent forms a weak complex with Fe(III).

It is another object of the present invention to develop a mixed solvent system for preparing conductive polymers which eliminates the need for removing a complexing agent by washing.

It is another object of the present invention to prepare conductive polymers by evaporating the low-boiling solvent followed by reacting the monomer, Fe(III) oxidizing agent, and dopant in the higher-boiling solvent.

It is yet another object of the present invention to prepare conductive polymers using a mixed solvent system without the need for removing a complexing agent by washing.

It is yet a further object of the present invention to deposit a conductive polymer in a tantalum pellet by dipping the pellet in a mixed solvent system which is highly stable at room temperature, and evaporating the lower-boiling solvent to allow the monomer to react with the oxidizing agent.

According to one aspect of the present invention, a stabilized precursor solution for preparing conductive polymers comprises:

(a) a monomer;

(b) an Fe(III) oxidizing agent;

(c) a first solvent having a first boiling point, wherein the first solvent does not appreciably complex with Fe(III); and (d) a second solvent having a second boiling point, wherein the second solvent forms a weak complex with Fe(III);

wherein the first boiling point is higher than the second boiling point.

The monomer may be pyrrole, thiophene, or derivatives thereof such as 3,4 ethylenedioxythiophene. The high-boiling solvent may be a ketone or lower alcohol such as 1-butanol. The lower-boiling solvent may be a dioxane or a cyclic ether such as tetrahydrofuran. A suitable oxidizing agent is Fe(III) tosylate.

According to another aspect of the present invention, a process for preparing a conductive polymer from a stabilized precursor solution comprises:

(a) dissolving a monomer and an Fe(III) oxidizing agent in a mixed solvent, the mixed solvent comprising a first solvent having a first boiling point, wherein the first solvent does not appreciably complex with Fe(III), and a second solvent having a second boiling point which is lower than the first boiling point, wherein the second solvent forms a weak complex with Fe(III);

(b) evaporating the second solvent; and (c) reacting the monomer and oxidizing agent to produce a conductive polymer.

According to yet another aspect of the invention, a process for depositing a conductive polymer in a porous pellet comprises:

(a) providing a porous pellet made from a material selected from the group consisting of tantalum, aluminum, niobium, zirconium, and hafnium;

(b) anodizing the pellet;

(c) dipping the pellet into a solution comprising a monomer, an Fe(III) oxidizing agent and a mixed solvent, the mixed solvent comprising a first solvent having a first boiling point, wherein the first solvent does not appreciably complex with Fe(III), and a second solvent having a second boiling point which is lower than the first boiling point, wherein the second solvent forms a weak complex with Fe(III);

(d) evaporating the second solvent;

(e) reacting the monomer with the oxidizing agent to form a conductive polymer; and (f) washing the pellet.

It has surprisingly been found that certain combinations of solvents will allow highly conducting polymers to be produced from the reactions of Fe(III) salts and monomer while, at the same time, stabilizing the reactants in solution prior to reaction. A mixture of two solvents wherein the higher-boiling solvent does not appreciably complex with Fe(III) and the lower-boiling solvent forms a weak complex with Fe(III) has been found to be effective for stabilizing the monomer yet enabling highly conductive polymers to be produced by evaporating the low-boiling, complexing solvent followed by reaction of the monomer, Fe(III) oxidizing agent, and dopant in the higher-boiling solvent. Because the lower-boiling solvent is completely removed by evaporation, there is no excess complexing agent to remove by washing.

DETAILED DESCRIPTION OF THE INVENTION

Suitable monomers for preparing conductive polymers which may be used in accordance with the present invention include but are not limited to pyrrole, thiophene, and derivatives thereof. Monomers for preparing conductive polymers are well known in the art, for example as taught by U.S. Pat. No. 4,910,645 to Jonas et al., incorporated by reference herein. A preferred monomer is 3,4 ethylenedioxythiophene.

Fe(III) oxidizing agents for preparing conductive polymers are also well known in the art. Jonas et al. teach various oxidants for the polymerization of thiophenes and pyrroles, which oxidants include Fe(III) salts of organic and inorganic acids, alkali metal persulfates, ammonium persulfates, and others. The preferred oxidant is Fe(III) tosylate.

The high-boiling solvent may be selected from solvents in which the monomer, Fe(III) salt and dopant are soluble and which do not interfere with the oxidization of the monomer by Fe(III). Examples of the higher-boiling solvent are lower alcohols and ketones. 1-butanol is a preferred solvent because iron salts such as Fe(III) tosylate and monomers such as pyrrole, thiophene and derivatives have good solubility.

The lower-boiling solvent should form a weak-to-moderate complex with Fe(III) so as to retard the reaction between Fe(III) and the monomer. However, the lower-boiling solvent should not complex the Fe(III) so strongly that it forms a stable complex upon evaporation. Examples of lower-boiling solvents that form weak complexes with Fe(III) are cyclic ethers. It has also been discovered that 1,4 dioxane is effective for stabilizing the monomer. Preferred ethers are unsubstituted cyclic ethers such as tetrahydrofuran and tetrahydropyran. The most preferred ether is tetrahydrofuran.

The difference between boiling points of the low-boiling solvent and the high-boiling solvent is preferably at least about 5° C., more preferably from about 5° C. to about 60° C. Most preferably the difference in boiling points is at least from about 15° C. to about 60° C.

The monomer may be provided in a concentration of from about 0.5 to about 12 percent by weight, preferably about 6 percent by weight. The higher-boiling solvent may be provided in a concentration of from about 10 to about 80 percent by weight, preferably about 16 percent by weight. The lower-boiling solvent may be provided in a concentration of from about 10 to about 80 percent by weight, preferably about 50 percent by weight.

A conductive polymer film may be produced by heating the solution to a temperature of from about 25° C. to about 160° C., preferably about 110° C. The heat should be applied for a time sufficient to evaporate the low-boiling solvent while facilitating the polymerization reaction between the monomer and Fe(III) oxidizing agent.

A conductive polymer cathode for a solid tantalum capacitor may be prepared by pressing charged tantalum powder into pellets and sintering to form a porous body. The pellets are then anodized in a phosphoric acid electrolyte at a voltage from about 14 V to about 140 V. Conductive polymer is then deposited in the anodized tantalum pellets by polymerization of the dipping solution at a temperature of from about 25° C. to about 160° C., preferably about 110° C., followed by washing in water or another solvent. The anodes may be reformed, e.g., after every 4th dip, in a 1% aqueous solution of p-toluenesulfonic acid. As will be appreciated by those skilled in the art, various other materials may be used for forming the capacitor, such as aluminium, niobium, zirconium, and hafnium.

EXAMPLES

Reference to the following illustrative examples is made for a more complete understanding of the invention. These examples are illustrative of preferred aspects of the invention and are not intended to limit the scope of the invention.

Example 1

Solutions of 3,4-ethylenedioxythiophene (monomer), Fe(III) tosylate (oxidizing agent and dopant), and solvent(s) were made according to the compositions given in Table 1. The monomer was obtained from Bayer under the trade name Baytron M, and the Fe(III) tosylate was obtained from Bayer as a 50 wt % solution in 1-butanol (trade name Baytron C). Here the 1-butanol is the high-boiling solvent (BP 117° C.). The other solvent was selected from the classes of alcohols, ketones, cyclic ethers, and amines that have a boiling point lower than that of 1-butanol.

Each of the solutions was placed in a closed vial. The initial color of the solutions ranged from yellow-brown to red-brown. The solutions were allowed to stand at room temperature for four hours. After this time period, the solutions were examined visually for color changes and also for the presence of precipitated PEDT powder. As the polymerization reaction proceeded, the color of the solution became blue, and blue precipitate of PEDT polymer formed.

TABLE 1

| Solution Compositions (by weight %) | | | | | | |
| --- | --- | --- | --- | --- | --- | --- |
| Component | A | B | C | D | E | F |
| 3,4 ethylenedioxythiophene | 4 | 4 | 4 | 4 | 4 | 4 |
| Fe(III) tosylate | 16 | 16 | 16 | 16 | 16 | 16 |
| 1-butanol | 80 | 16 | 16 | 16 | 16 | 16 |
| 2-propanol | 0 | 64 | 0 | 0 | 63.4 | 0 |
| Methanol | 0 | 0 | 64 | 0 | 0 | 0 |
| Acetone | 0 | 0 | 0 | 64 | 0 | 0 |
| Pyridine | 0 | 0 | 0 | 0 | 0.6 | 0 |
| Tetrahydrofuran | 0 | 0 | 0 | 0 | 0 | 64 |

TABLE 2

Reactions of Solutions at Room Temperature

| Solution | Initial Color | Color at 4 Hours | Precipitate |
|---|---|---|---|
| A | Yellow-Brown | Blue | Yes |
| B | Yellow-Brown | Blue | Yes |
| C | Yellow-Brown | Blue | Yes |
| D | Yellow-Brown | Blue | Yes |
| E | Red-Brown | Red-Brown | No |
| F | Red-Brown | Red-Brown | No |

Mixtures of lower alcohols failed to inhibit the polymerization reaction in solution. The solvent mixture of 1-butanol and acetone also failed to inhibit the polymerization reaction. On the other hand, mixtures of alcohols and basic solvents such as pyridine and tetrahydrofuran inhibited the polymerization reaction in solution.

Films of PEDT were cast from some of the solutions of Table 1. The films were prepared by placing some of the solution on a glass slide and heating to 110° C. for 10 minutes. Films prepared from solutions A, B, C, D, and F produced light blue conductive films of PEDT. Films prepared from the pyridine-containing solution were yellow-green and non-conductive. Tetrahydrofuran was the only low-boiling solvent tested that inhibited the reaction of 3,4 ethylenedioxythiophene in solution yet allowed a conductive film of PEDT to be produced.

Example 2

Solutions of 3,4 ethylenedioxythiophene (monomer), Fe(III) tosylate (oxidizing agent and dopant), and solvent(s) were made according to the compositions given in Table 3. The monomer was obtained from Bayer under the trade name Baytron M, and the Fe(III) tosylate was obtained from Bayer as a 50 wt % solution in 1-butanol (trade name Baytron C). Here the 1-butanol is the high-boiling solvent (BP 117° C.). The other solvent was selected from the classes of alcohols, cyclic ethers, and furans that have a boiling point lower than that of 1-butanol.

Each of the solutions was placed in a closed vial. The solutions were allowed to stand at room temperature for eight hours. After this time period, the solutions were examined visually for color changes and also for the presence of precipitated PEDT powder. As the polymerization reaction proceeded, the color of the solution became blue, and blue precipitate of PEDT polymer formed.

TABLE 3

Solution Composition (by weight %)

| Component | G | H | I | J | K |
|---|---|---|---|---|---|
| 3,4 ethylenedioxythiophene | 6 | 6 | 6 | 6 | 6 |
| Fe(III) tosylate | 24 | 24 | 24 | 24 | 24 |
| 1-butanol | 24 | 24 | 24 | 24 | 24 |
| 2-propanol | 46 | 0 | 0 | 0 | 0 |
| Tetrahydrofuran | 0 | 46 | 0 | 0 | 0 |
| 2-methyl tetrahydrofuran | 0 | 0 | 46 | 0 | 0 |
| Tetrahydropyran | 0 | 0 | 0 | 46 | 0 |
| 2,5 dimethyl furan | 0 | 0 | 0 | 0 | 46 |

TABLE 4

Reaction of Solutions at Room Temperature

| Solution | Initial Color | Color at 8 hours | Precipitate |
|---|---|---|---|
| G | Yellow-Brown | Dark Blue | Yes |
| H | Red-Brown | Red-Brown | No |
| I | Red-Brown | Dark Red-Brown | No |
| J | Red-Orange | Darker Red-Orange | No |
| K | Red-Yellow | Dark Green | Yes |

Films were prepared from the solutions as in Example 1. Solutions G and H produced good quality blue PEDT films. Solutions I and K produced dark blue powdery material. Solution J produced a PEDT film of somewhat darker color than did Solutions G and H. Both tetrahydrofuran and tetrahydropyran inhibited the reaction between Fe(III) and 3,4 ethylenedioxythiophene in solutions containing more than 5 wt % monomer while allowing conductive films of PEDT to be formed.

Example 3

Solutions of 3,4 ethylenedioxythiophene (monomer), Fe(III) tosylate (oxidizing agent and dopant), and solvent(s) were made according to the compositions given in Table 5. The monomer was obtained from Bayer under the trade name Baytron M, and the Fe(III) tosylate was obtained from Bayer as a 50 wt % solution in 1-butanol (trade name Baytron C).

TABLE 5

Solution Composition (by weight %)

| Component | L | M | N |
|---|---|---|---|
| 3,4 ethylenedioxythiophene | 4 | 4 | 4 |
| Fe(III) tosylate | 16 | 16 | 16 |
| 1-butanol | 16 | 16 | 16 |
| Water | 1 | 1 | 1 |
| 2-Propanol | 63 | 0 | 0 |
| Tetrahydrofuran | 0 | 63 | 0 |
| Tetrahydropyran | 0 | 0 | 63 |

PEDT films were cast from each solution on mylar film using an ACCU-LAB draw-down rod from Paul N. Gardner Company (Model AP-JR 80). Surface resistances are shown in Table 6.

TABLE 6

Surface Resistance of Cast PEDT Films

| Solution | Surface Resistance (ohms/sq) |
|---|---|
| L | 95 |
| M | 79 |
| N | 12,860 |

The use of tetrahydrofuran in the solution allowed production of films of comparable surface resistance to films produced from solutions with 2-propanol, but in the case of tetrahydrofuran the solutions were stabilized against reaction. Tetrahydropyran also stabilized the solutions against reaction, but PEDT films produced had higher surface resistances. Thus, tetrahydropyran is not as desirable a solvent as tetrahydrofuran.

Example 4

Tantalum powder of charge 26,000 CV/g was pressed into pellets and sintered to form a porous body of dimensions 0.81 mm thick, 2.92 mm wide, and 3.94 mm long. The pellets (anodes) were sintered and then anodized (formed) in a phosphoric acid electrolyte to 28 volts. Dipping solutions with the compositions given in Table 7 were prepared. Conductive polymer was deposited in the anodized tantalum pellets by polymerization of the dipping solution at 110° C. followed by washing in water. The anodes were reformed after every 4th dip in a 1% aqueous solution of p-toluenesulfonic acid. After 12 dips, a conductive polymer dispersion (Baytron P from Bayer) was applied followed by a silver paint.

The electrical parameters of the capacitors are shown in Table 8. Both tetrahydrofuran and tetrahydropyran stabilized the dipping solutions against polymerization in the dipping bath. Solutions containing tetrahydrofuran could be used to produce capacitors with equal electrical characteristics to those produced from solutions containing the non-inhibiting 2-propanol.

TABLE 7

Composition of Impregnation Solutions (by weight %)

| Component | O | P | Q |
| --- | --- | --- | --- |
| 3,4 ethylenedioxythiophene | 4 | 4 | 4 |
| Fe(III) tosylate | 16 | 16 | 16 |
| 1-butanol | 16 | 16 | 16 |
| Water | 1 | 1 | 1 |
| 3-glycidoxypropyltrimethoxy silane | 0.5 | 0.5 | 0.5 |
| 2-propanol | 62.5 | 0 | 0 |
| Tetrahydrofuran | 0 | 62.5 | 0 |
| Tetrahydropyran | 0 | 0 | 62.5 |

TABLE 8

Capacitor Performance

| Dipping Solution | Capacitance (microfarad) | DF (%) | ESR (ohms) | Leakage (microamps) |
| --- | --- | --- | --- | --- |
| O | 42.9 | 2.6 | 0.13 | 1.53 |
| P | 43.0 | 2.5 | 0.13 | 0.71 |
| Q | 22.2 | 37.2 | 1.15 | 0.26 |

Wherein DF is dissipation factor and ESR is equivalent series resistance.

Example 5

A solution was prepared having 6 wt % 3,4 ethylenedioxythiophene (monomer), 24 wt % Fe(III) tosylate (oxidizing agent and dopant), 24 wt % 1-butanol, and 46 wt % 1,4 dioxane. The monomer was obtained from Bayer under the trade name Baytron M, and the Fe(III) tosylate was obtained from Bayer as a 50 wt % solution in 1-butanol (trade name Baytron C). Here the 1-butanol was the high-boiling solvent (BP 117° C.).

The solution was placed in a closed vial. The initial color of the solution was red-brown. The solution was allowed to stand at room temperature for 8 hours. After this time period, the solution was examined visually for color changes and also for the presence of precipitated PEDT powder. The color of the solution remained red-brown and no precipitate of PEDT polymer was formed.

A film of PEDT was cast from the solution obtained. The film was prepared by placing some of the solution on a glass slide and heating to 110° C. for 10 minutes. The film produced a light blue conductive film of PEDT. The 1,4 dioxane low-boiling solvent inhibited the reaction of 3,4 ethylenedioxythiophene in solution yet allowed a conductive film of PEDT to be produced.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process for preparing a conductive polymer from a stabilized precursor solution comprising:

(a) dissolving a monomer and an Fe(III) oxidizing agent in a mixed solvent, the mixed solvent comprising a first solvent having a first boiling point, wherein the first solvent does not appreciably complex with Fe(III), and a second solvent having a second boiling point which is lower than the first boiling point, wherein the second solvent forms a weak complex with Fe(III);

(b) evaporating the second solvent; and (c) reacting the monomer and oxidizing agent to produce a conductive polymer.

2. The process of claim 1 wherein the first solvent is selected from the group consisting of lower alcohols and ketones.

3. The process of claim 2 wherein the first solvent is 1-butanol.

4. The process of claim 1 wherein the second solvent is selected from the group consisting of cyclic ethers and dioxanes.

5. The process of claim 4 wherein the second solvent is tetrahydrofuran.

6. The process of claim 1 wherein the monomer is selected from the group consisting of pyrrole, thiophene and derivatives thereof.

7. The process of claim 6 wherein the monomer is 3,4-ethylenedioxythiophene.

8. The process of claim 1 wherein the oxidizing agent is Fe(III) tosylate.

9. The process of claim 1 wherein the monomer is present in an amount of from about 0.5 to about 12 percent by weight.

* * * * *